(12) United States Patent
Hayoun et al.

(10) Patent No.: US 7,103,093 B2
(45) Date of Patent: Sep. 5, 2006

(54) METHOD AND DEVICE FOR ESTIMATING A PROPAGATION CHANNEL

(75) Inventors: Lionel Hayoun, Creteil (FR); Didier Pirez, St Gratien (FR)

(73) Assignee: Thales, Paris (FR)

( * ) Notice: Subject to any disclaimer, the term of this patent is extended or adjusted under 35 U.S.C. 154(b) by 747 days.

(21) Appl. No.: 10/204,425

(22) PCT Filed: Feb. 23, 2001

(86) PCT No.: PCT/FR01/00542

§ 371 (c)(1),
(2), (4) Date: Aug. 29, 2002

(87) PCT Pub. No.: WO01/65789

PCT Pub. Date: Sep. 7, 2001

(65) Prior Publication Data

US 2003/0053522 A1    Mar. 20, 2003

(30) Foreign Application Priority Data

Feb. 29, 2000  (FR) .................................. 00 02548

(51) Int. Cl.
*H04B 1/69* (2006.01)
*H04B 1/707* (2006.01)
*H04B 1/713* (2006.01)

(52) U.S. Cl. ...................... 375/148; 375/144; 375/349; 370/335; 370/342

(58) Field of Classification Search ................ 375/148, 375/144, 349, 346, 229, 230, 231; 370/335, 370/342; 455/67.13
See application file for complete search history.

(56) References Cited

U.S. PATENT DOCUMENTS

| 5,251,233 | A  |   | 10/1993 | Labedz et al. |
|-----------|----|---|---------|---------------|
| 5,544,156 | A  |   | 8/1996  | Teder et al.  |
| 5,572,548 | A  |   | 11/1996 | Pirez et al.  |
| 5,754,599 | A  |   | 5/1998  | Ling et al.   |
| 6,182,251 | B1 | * | 1/2001  | Rahnema et al. ........... 714/704 |
| 6,243,415 | B1 |   | 6/2001  | Pipon et al.  |
| 6,483,821 | B1 | * | 11/2002 | Dabak et al. ................ 370/329 |
| 6,542,560 | B1 | * | 4/2003  | Buehrer et al. .............. 375/346 |
| 6,721,299 | B1 | * | 4/2004  | Song ........................... 370/342 |
| 6,757,272 | B1 | * | 6/2004  | Abeta et al. ................. 370/342 |
| 6,791,960 | B1 | * | 9/2004  | Song ........................... 370/335 |

FOREIGN PATENT DOCUMENTS

EP       0 942 561       9/1999

* cited by examiner

*Primary Examiner*—Phuong Phu
(74) *Attorney, Agent, or Firm*—Oblon, Spivak, McClelland, Maier & Neustadt, P.C.

(57) ABSTRACT

The invention relates to a method of estimating a propagation channel, between a source transmitting data and a receiver, using at least one learning sequence which comprises symbols referred to as "pilot symbols" and which is known to the receiver, so as to decode a data signal (digital signal), the signals being sent in successive frames, each frame being partitioned into a specified number of time slots.

Figure 1:
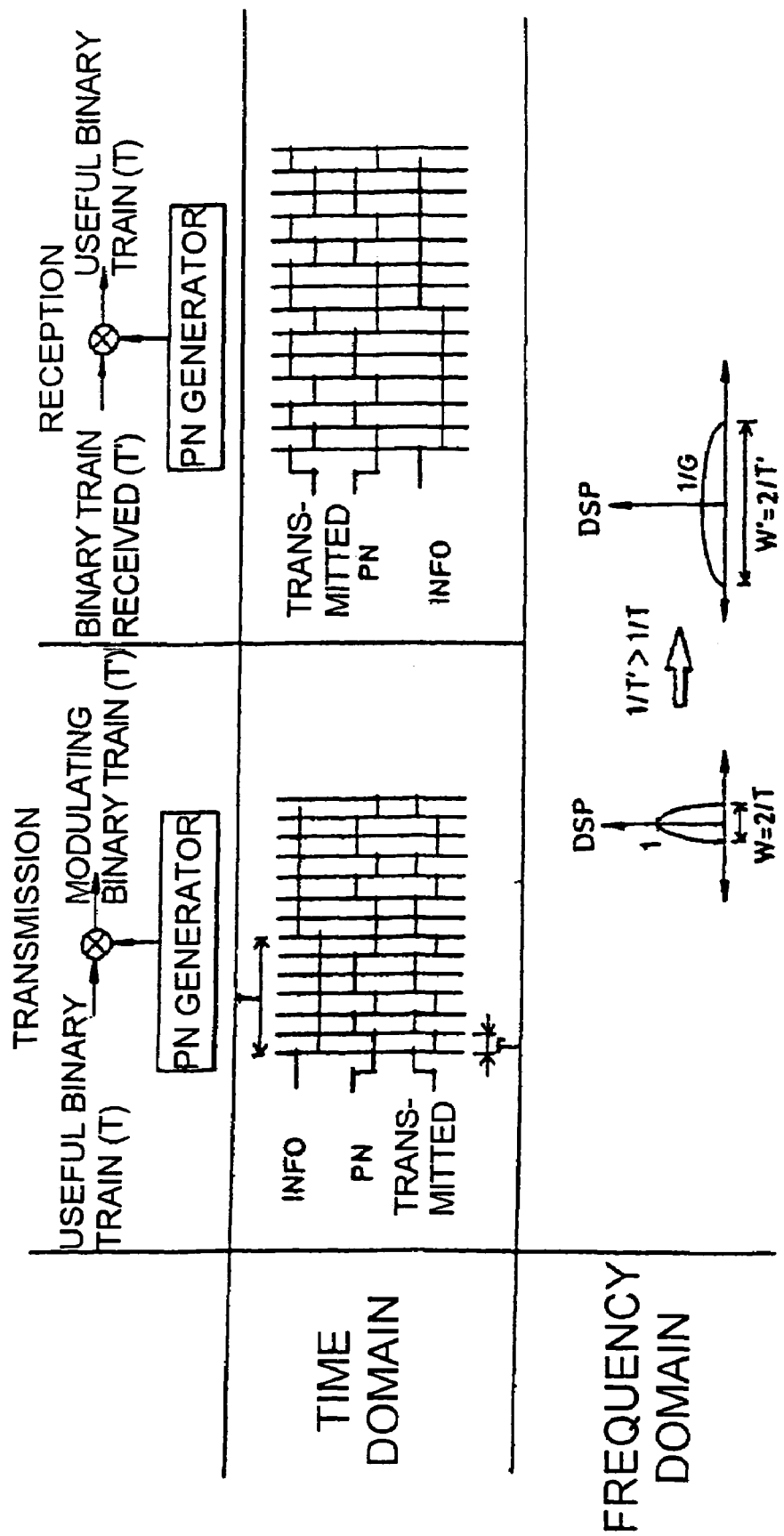

It comprises at least the following steps:
a) choosing a search window, estimating the complex amplitude and the energy of each predominant path k situated in the search window over the duration of each of the time slots and demodulating the data bits (useful bits),
b) updating the energy of each possible path of the search window every K slots,
c) selecting every K*L slots, the energy paths k which are predominant.
d) Application to the demodulation of a signal of CDMA type, or of UMTS type.

10 Claims, 8 Drawing Sheets

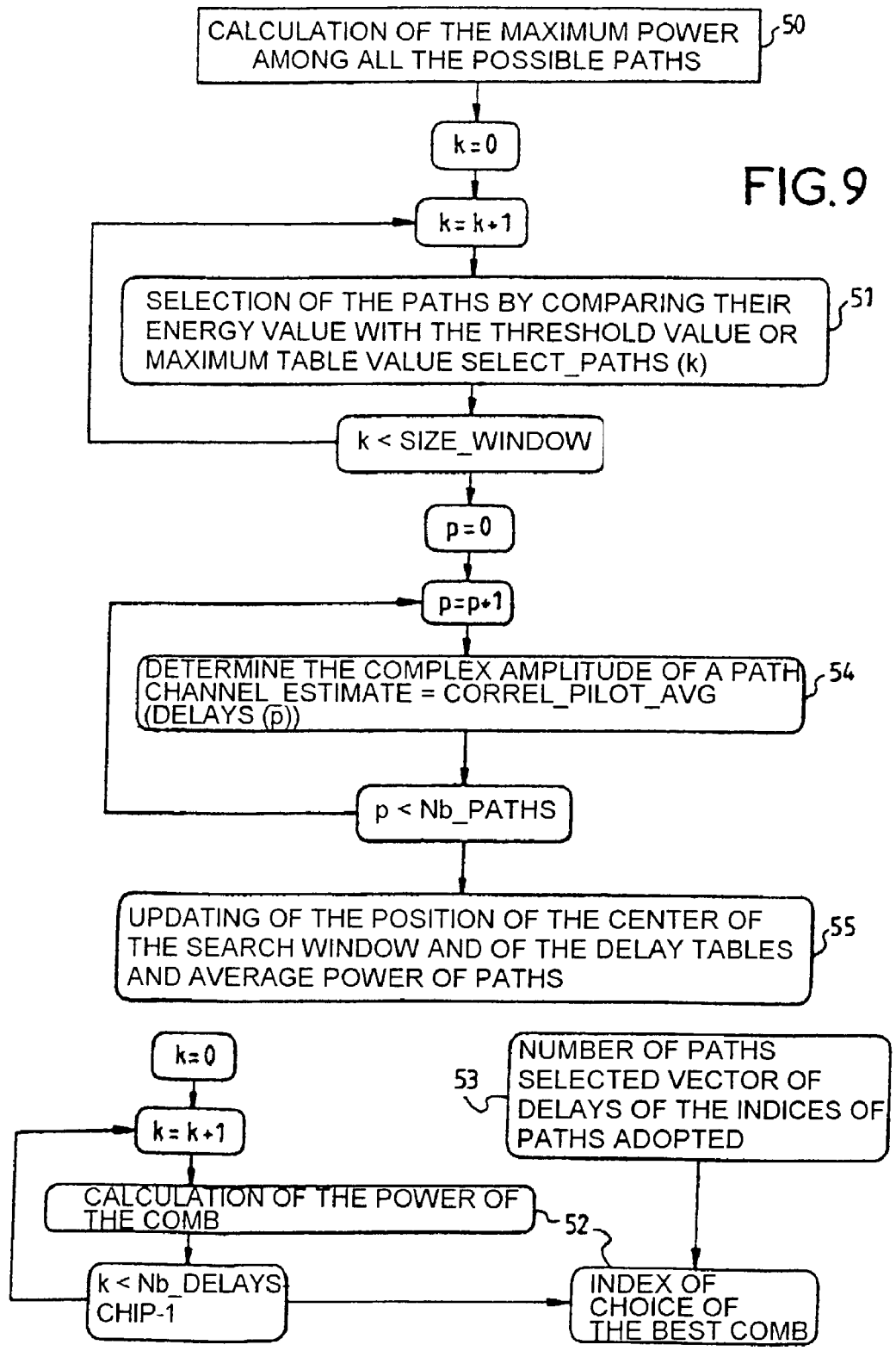

METHOD AND DEVICE FOR ESTIMATING A PROPAGATION CHANNEL

BACKGROUND

1. Field of Invention

The present invention relates to a method and a device for estimating the parameters of a propagation channel, so as to decode digital signals, by using a learning sequence or reference sequence known to the receiver. The signals are sent in successive frames, each frame being partitioned into a specified number of time slots.

The invention applies for example for demodulating a broadband or spread spectrum digital signal.

The invention finds its application in the field of cellular networks operating on the "CDMA" principle (the abbreviation standing for Code Division Multiple Access), such as the networks based on the IS95 standard which has been in service for several years in the USA, or else those based on the UMTS standard (the abbreviation standing for Universal Mobile Telecommunication System) which ought to be operational in Europe at least by the year 2002. It applies in particular within the framework of mobile radio communications.

The method according to the invention can without departing from the scope of the invention be applied to propagation channels of any nature.

2. Description of Related Art

In a CDMA system all the users share the same band and use waveforms which are spectrally spread with the aid of codes, each user having his own code.

By way of indication, a description of such a system can be found in one of the following references:

[2] W.C.Y. LEE, "Overview of cellular CDMA", IEEE Transactions on vehicular technology, vol. 40, No. 2, May 1991 or

[3] R. L. PICKHOLTZ, D. L. SHILLING and L. B. MILSTEIN, "Theory of spread-spectrum communications—A tutorial", IEEE Transactions on communications, vol. com-30, No. 5, pp 855–884, May 1982.

The principle of direct sequence spread spectrum is to chop a useful bit of duration T into $N_G$ pulses or chips of duration $T'=T/N_G$. The band W' of the resulting signal is thus $N_G$ times larger than that of the useful signal W, thereby theoretically allowing $N_G$ times as large a modulation rate. The pulse sequences or codes, are generally pseudo-random sequences (PN sequences), designed to have particular autocorrelation and cross-correlation properties (ideally, the autocorrelation is pulse-like and the correlations between codes are zero). Such sequences are described for example in the two works: [1]: J. G. PROAKIS, "Digital communications", McGraw Hill and the aforesaid reference [2].

On reception, each user (or transmission channel) is demodulated by an operation of correlation with its spreading code, known to the receiver. This processing is a matched filtering which imparts a reception gain equal to the ratio of the spread band to the initial useful band represented in FIG. 1.

The CDMA concept allows not only multiple access (large combinatorial offered by pseudo-random codes, for allocating a different code to each user) but also increased robustness to scrambling (intentional or otherwise) and to poor propagation conditions (multipaths, fading, etc).

At present, it is known to use a spectrally spread waveform in order to effectively counter the phenomenon of multipaths (this phenomenon occurs for various propagation channels and in particular for the mobile radio channel) and even to profit therefrom in order to combat fading (random variations in the amplitude and phase of the signal).

Specifically, if $T_m$ is the temporal spreading of the channel and if W is the bandwidth of the signal transmitted, then it is theoretically possible to isolate in reception $T_m W$ components (a bandwidth W makes it possible in reception, by correlation, to isolate paths with a temporal resolution equal to 1/W), which correspond physically to the various propagation paths. All or some of these components are independent and it is possible to recombine them in such a way as to increase or maximize the signal-to-noise ratio. A diversity effect is thus obtained, exploiting the statistical independence of the various propagation paths making up the signal received.

This diversity technique was initially proposed by Price and Green in 1958 who gave the name RAKE receiver to the optimal processing (the receiver isolates each path and then undertakes a recombination, hence the analogy with a garden rake). This processing, which coherently sums all the paths, consists simply of a filtering matched to the signal received, that is to say matched to the channel (it may be shown that this processing is optimal provided one considers the reception of a single user or code, all the other users constituting noise possessing the property of being white and gaussian).

In this regard, reference may be made for example to the work "Digital communications" published by McGraw Hill and authored by J. G. Proakis.

The implementation of the RAKE receiver therefore assumes that the impulse response of the channel, that is to say the complex amplitudes of all the paths, is known. In practice, it is possible to employ an estimate of these amplitudes which takes account of the various characteristics of the propagation channel (temporal spreading, fading) and in particular of its various scales of fluctuation (fast fading and slow fading).

On the mobile radio channel, two scales of variation of the propagation characteristics are generally distinguished, described for example in the work authored by D. Parsons and published by Pentech Press in 1992 under the title "The mobile radio propagation channel".

The first scale corresponds to fast fading (or Rayleigh fading), which induces a variation in the amplitudes and phases of the paths after a time of the order of the channel coherence time (the inverse of the Doppler band of the channel). In the mobile radio context, this decorrelation time (time interval for which two realizations of the complex amplitude of a path are decorrelated) corresponds to an advance of the mobile of the order of half the wavelength of the carrier frequency reference [4], On this timescale, the delay times of the paths are constant.

The second scale of fluctuation corresponds to slow fading (or long-term fading), due to the masking effects and to the changes of environment. This phenomenon induces on the one hand a modification of the average power of the paths, and on the other hand a significant alteration in the delay times of the paths; some paths are also liable to appear and others to disappear.

The decorrelation time (or the decorrelation distance) associated with slow fading depends on the channel, that is to say on the type of environment in which the mobile is deploying. In practice, this decorrelation time is markedly greater (at least an order of magnitude) than that associated with fast fading. For example, the ETSI within the framework of UMTS, indicates a slow fading decorrelation distance, for an urban environment, of around 20 meters; this leads to a ratio of around 300 (20/(λ/2) with λ=c/f and f=2 10⁹ Hz) between the long-term and short-term decorrelation times.

The subject of the invention relates to a method allowing dynamic estimation of the propagation channel, taking account of the various fluctuations alluded to above, with the aim of demodulating a digital signal.

The method is applied in particular in the following cases:

Single-user reception, that is to say when interested in the demodulation of just one user, all the others being regarded as noise (no joint detection or multiuser detection);

Transmission of a reference sequence, in addition to the useful data, which is dedicated to the estimation of the propagation channel;

The propagation channel is fluctuating;

The temporal spreading of the channel is less than the duration of a useful bit. Thus, the inter-symbol interference can be neglected and the implementation of an equalizer downstream of the RAKE receiver is not necessary. Each bit or useful symbol is demodulated independently of the other bits or useful symbols;

The channel can be regarded as constant over the duration of a bit or useful symbol ($T_{coherence} \gg T$, where $T_{coherence}$ is the channel coherence time).

The word "symbol" designates a unit of information, the expression "learning symbol" or "pilot" corresponds to a unit of information of the known signal.

BRIEF SUMMARY OF THE INVENTION

The invention relates to a method of estimating a propagation channel, between a source transmitting data and a receiver, using at least one learning sequence which comprises symbols referred to as "pilot symbols" said sequence being known to the receiver, so as to decode a data signal (digital signal), the signals being sent in successive frames, each frame being partitioned into a specified number of time slots it is characterized in that it comprises at least the following steps:

a) choosing a search window, estimating the complex amplitude and the energy of each predominant path k situated in the search window over the duration of each of the time slots and demodulating the data bits (useful bits), b) updating the energy of each possible path of the search window every K slots, and c) selecting every K*L slots, the energy paths k which are predominant.

The invention also relates to a device making it possible to estimate a propagation channel between a means of transmission and a means of reception so as to demodulate the useful data received. It is characterized in that it comprises at least one microprocessor or device suitable for implementing the method according to the invention, the signal possibly being a spread signal and possibly being demodulated according to the RAKE principle.

The device and the method according to the invention apply for demodulating a spread band signal of the CDMA type, such as a signal of the UMTS type.

The method according to the invention offers the advantage in particular of affording "in real time" one or more estimated parameters of a propagation channel, of updating these parameters so as to improve the demodulation of the signals received by a receiver operating on the RAKE principle. The improvement consists in particular in circumventing the variations in the channel parameters such as the temporal spreading, the variation in amplitude and in phase of a path.

BRIEF DESCRPTION OF THE DRAWINGS

Figure 2:
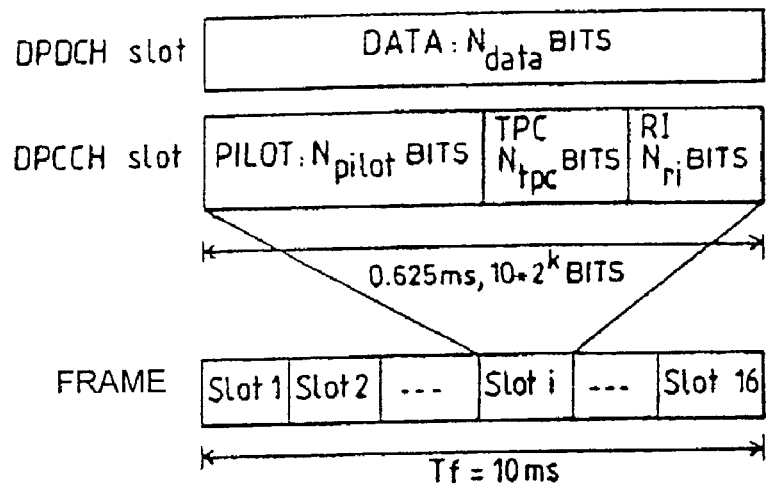
Figure 3:
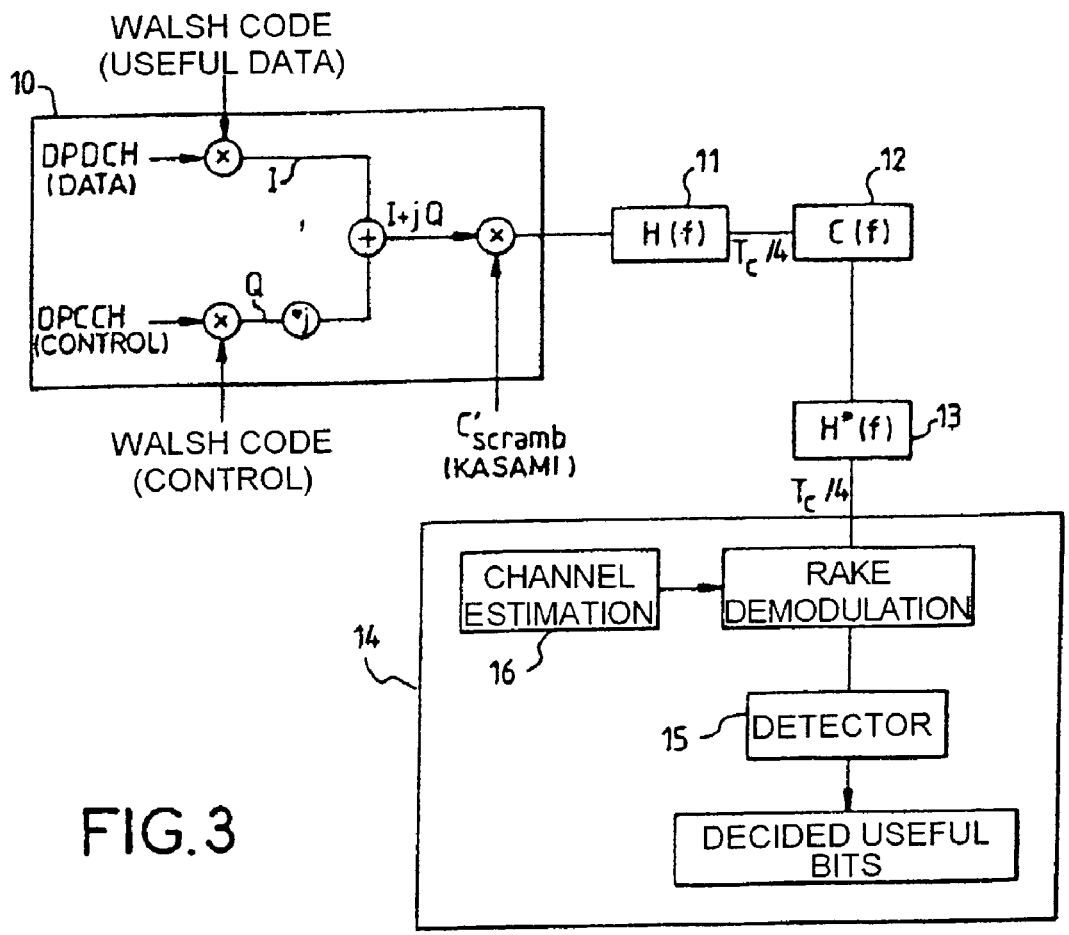
Figure 4:
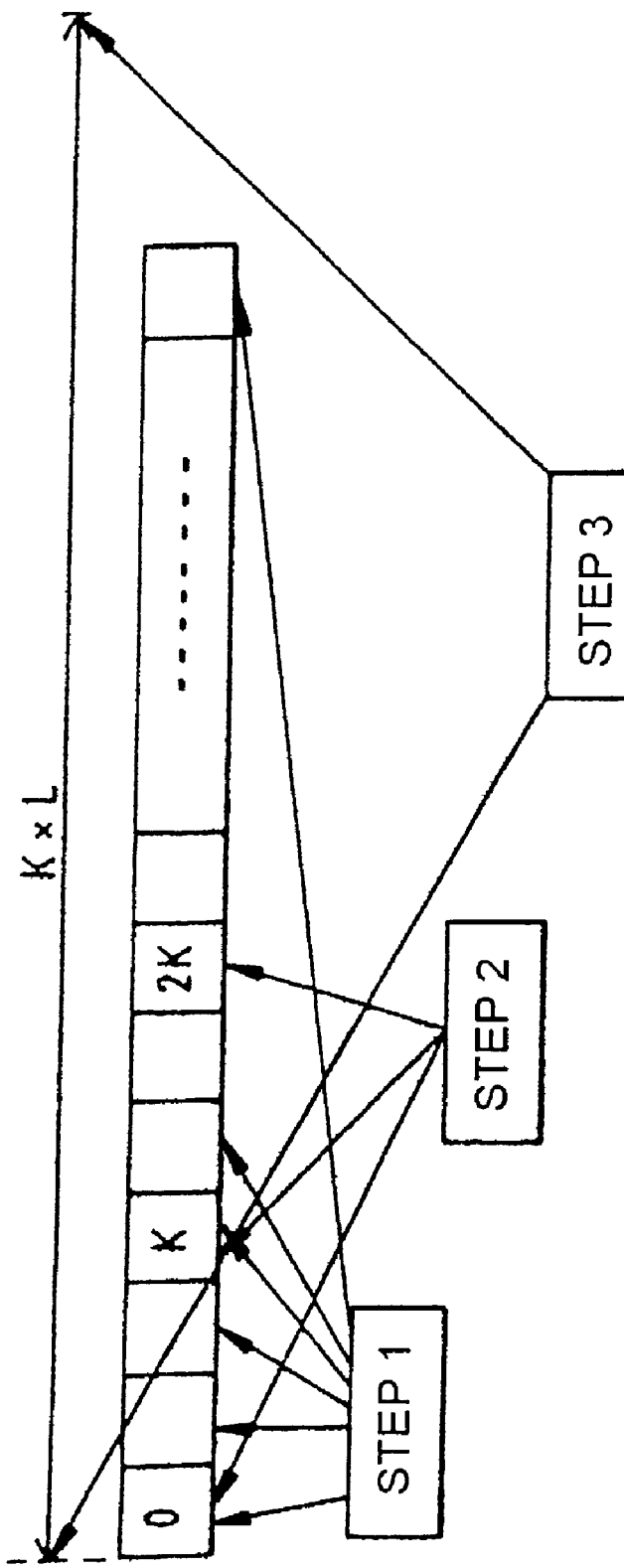
Figure 5:
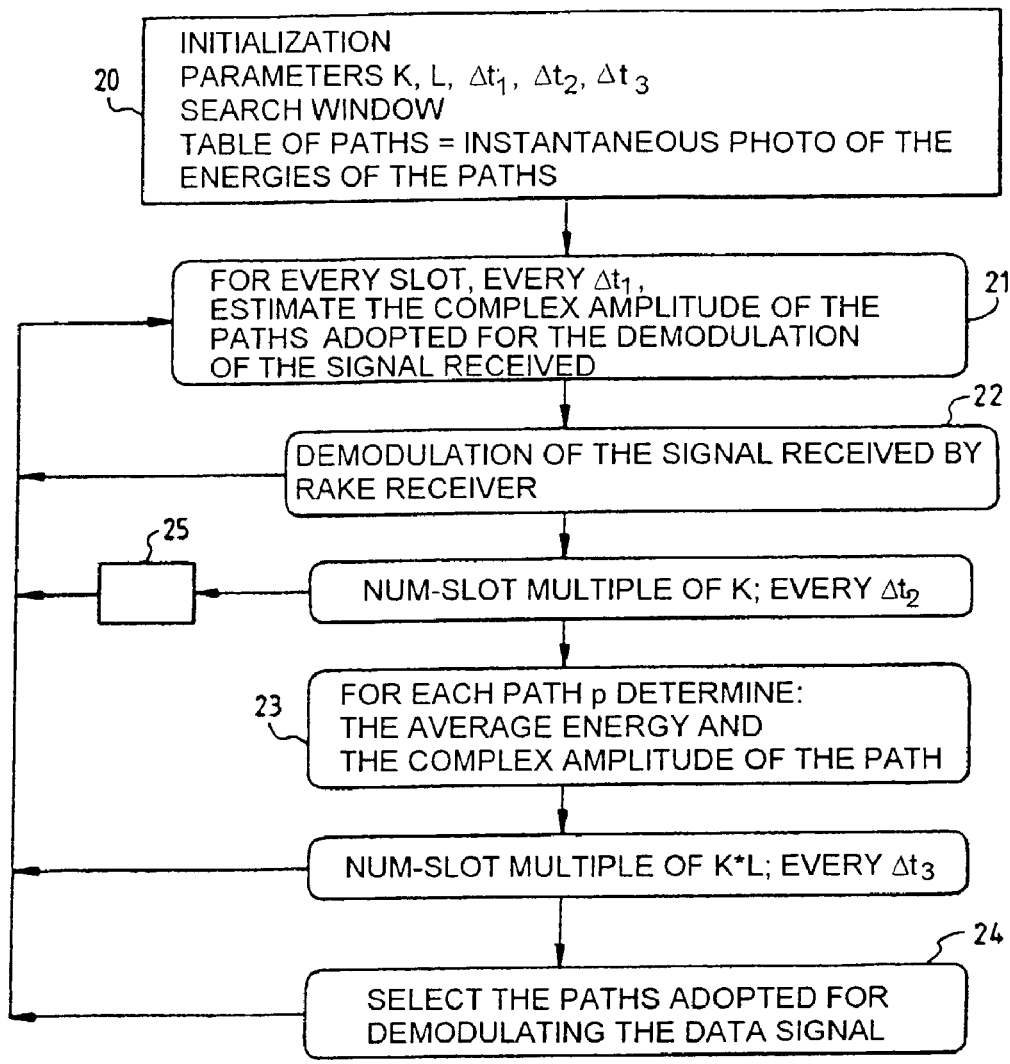

The invention will be better understood on reading the description which follows by way of wholly non-limiting illustration of an example relating to the estimation of a digital signal propagation channel of the UMTS type where:

FIG. 1 represents a spread spectrum diagram,

FIG. 2 diagrammatically shows a waveform for the uplink from a transmitter to a receiver, FIG. 3 diagrammatically shows a schematic of transmission-reception of a UMTS wave according to the invention, FIG. 4 diagrammatically shows periods of implementation of the three steps of the method according to the invention on the frame of a signal, FIG. 5 is an exemplary flowchart of an estimation of a propagation channel implemented in the mode of invention more especially described hereinbelow, and FIGS. 6 to 9 detail the steps of FIG. 5 in the form of flowcharts.

DETAILED DESCRIPTION OF THE INVENTION

Before setting out the various steps of the method according to the invention, the aim of the paragraph below is to enable the reader to grasp the principles of the RAKE receiver used in the example given by way of wholly nonlimiting illustration.

Let us consider the transmission of a BPSK modulated signal (the abbreviation standing for Binary Phase Shift Keying) at the rate $T_s$ (the extension to other phase modulations poses no problem: the structure of the receiver is identical, only the downstream decision procedure is modified) and spread by direct sequence with a gain $N=T_s/T_c$ where $T_c$ is the chip duration. The signal transmitted is therefore of the form (baseband):

$$s(t)=\sqrt{P_s}d(t)c(t)$$

where $P_s$ is the signal power, and $d(t)$ the sequence of useful bits, $$d(t) = \sum_{k=-\infty}^{+\infty} d_k g_{T_s}(t - kT_s)$$

$d_k=\pm 1$, equiprobably, $g_{T_s}$ is the pulse used to convey the information, assumed to be rectangular here for the sake of simplicity:

$$\begin{cases} g_{T_s}(t) = 1 \text{ if } 0 \le t \le T_s \\ g_{T_s}(t) = 0 \text{ otherwise} \end{cases}$$

$c(t)$ is the spreading code which ideally has an impulse autocorrelation function (that is to say the correlation between two versions of the code shifted by any non zero time equals 0), $$c(t) = \sum_{k=-\infty}^{+\infty} c_k g_{T_c}(t - kT_c)$$

with $C_{k=\pm}1$

If the impulse response of the channel has the expression:

$$h(t) = \sum_{k=1}^{N_t} a_k e^{j\varphi_k} \delta(t - \tau_k)$$

that is to say the propagation channel consists of $N_t$ paths, with complex amplitudes $a_k e^{j\phi k}$ and with propagation times $\tau_k$, with $\forall i \neq j |\tau_i - \tau_j| \geq T_c$ (stated otherwise all the paths are discernable) then the (complex baseband) signal received has the expression:

$$r(t) = \sum_{k=1}^{N_t} \sqrt{P_s}\, a_k e^{j\varphi_k} d(t - \tau_k) c(t - \tau_k) + n(t) \quad (E1)$$

where n(t) represents the thermal noise, assumed to be complex gaussian centered, temporally white and decorrelated from the useful signal, with spectral density $N_0$.

The principle of the RAKE is to isolate the contributions of each path and then to recombine them under phase coherence so as to optimize the signal-to-noise ratio.

In all that follows, it will be assumed that the inter-symbol interference is negligible, stated otherwise that the duration of a symbol is large compared with the temporal spreading of the channel. This assumption is often satisfied in practice and it is adopted, explicitly or implicitly, by most authors. The RAKE receiver will therefore be implemented independently on each symbol $d_k$.

It is assumed moreover that the channel is constant for the duration of a useful symbol ($\Delta t_c >> T_s$, $\Delta t_c$ being the channel coherence time).

The contribution of a path is obtained by correlating the signal received with the spreading code shifted by the delay of the relevant path, assumed known.

Thus, the contribution of the path with delay $\tau_1$, calculated with regard to the symbol of index k, is given by $$r_i(k) = \frac{1}{T_s} \int_{(T_s)} s(t) c(t - \tau_i) dt \quad (E2)$$

(for the sake of simplicity, it is assumed that the samples of the signal are received at the chip rate):

Expanding (E2) with the aid of (E1) leads to three terms, the first constituting the useful part and the other two constituting the nuisance part:

$$r_i(k) = \frac{1}{T_s} \int_{(T_s)} \sqrt{P_s}\, a_i e^{j\varphi_i} d(t - \tau_i) c(t - \tau_i)^2 dt +$$

$$\frac{1}{T_s} \sum_{\substack{j=1 \\ j \neq i}}^{N_t} \sqrt{P_s}\, a_j e^{j\varphi_j} d_k \int_{(T_s)} c(t - \tau_i) c(t - \tau_j) dt +$$

$$\frac{1}{T_s} \int_{(T_s)} n(t) c(t - \tau_i) dt$$

The spreading code is designed in such a way that two versions shifted by a time greater than the chip duration are approximately decorrelated (the inter-path interference is thus minimized):

$$\frac{1}{T_s} \int_{(T_s)} c(t - \tau_i) c(t - \tau_j) dt \approx \frac{1}{N} \ll 1 \text{ for } |\tau_i - \tau_j| \geq T_c \quad (P_1)$$

The contribution of path i may therefore be written:

$$r_i(k) = \sqrt{P_s}\, a_i e^{j\phi_i} d_k + b_i(k)$$

$b_i(k)$ being the nuisance term containing both the thermal noise and the interference created by the other paths. A simple calculation shows that in the absence of inter-path interference, the power of the noise $b_i(k)$ is equal to $N_0/T_s$.

The problem is now posed as follows: given the $N_t$ contributions $r_i(k)$ (it is assumed here that the number of taps of the receiver is equal to the actual number of paths), we seek a set of complex weights ($w_1, w_2, \ldots, w_{Nt}$) such that the signal-to-noise ratio of the recombined signal r(k) is a maximum:

$$r(k) = \sum_{i=1}^{N_t} w_i^* r_i(k)$$

where $w_i^*$ is the complex conjugate of $w_i$.

The signal-to-noise ratio of r(k) is defined by (E(x) denotes the mean value of x):

$$RSB = (r(k)) = \frac{\left| \sum_{i=1}^{N_t} w_i^* \sqrt{P_s}\, a_i e^{j\varphi_i} d_k \right|^2}{E\left( \left| \sum_{i=1}^{N_t} w_i^* b_1(k) \right|^2 \right)}$$

If it is assumed that the noise terms associated with each path $b_i(k)$ are uncorrelated and have the same average power $P_b$, then the optimal weighting is given by (Schwartz's inequality):

$$w_i = k a_i e^{j\phi_i}$$

where k is an arbitrary constant.

Each path is therefore weighted in accordance with its own signal-to-noise ratio.

Finally, the optimal RAKE receiver therefore calculates, for the symbol k, the quantity (assuming that the estimation of the channel parameters is perfect):

$$r(k) = \sum_{i=1}^{N_t} a_i e^{-j\varphi_i} \left( \frac{1}{T_s} \int_{(T_s)} s(t)c(t-\tau_i)dt \right) = \sqrt{P_s} \left( \sum_{i=1}^{N_t} a_i^2 \right) d_k + b(k) \quad (E3)$$

with $$b(k) = \sum_{i=1}^{N_t} a_i e^{-j\varphi_i} b_i(k)$$

and the symbol is decided by comparing the real part (theoretically, to within noise, r(k) is real) of r(k) with 0 (under BPSK).

The signal-to-noise ratio obtained equals:

$$RSB_{RAKE} = \left( \sum_{i=1}^{N_t} a_i^2 \right) \frac{P_s}{P_b}$$

This is the sum of the signal-to-noise ratios relating to each of the paths.

The RAKE processing is optimal in the absence of interference between symbols (in the strict sense, this implies that the propagation channel contains just one path or that the autocorrelation function of the code is ideal) and if the noise (thermal noise+inter-user interference) is white (this signifying that the codes of the various users are orthogonal for all possible time shifts).

The implementation of the RAKE receiver, described by equation (E3), assumes that the complex amplitudes $a_k\, e^{j\phi_k}$ and the delays $\tau_k$ of the paths are known. In practice, only an estimate of these parameters can be obtained, which in general is produced by transmitting a sequence of symbols which is known to the receiver (and designated by the term reference sequence or pilot sequence or else learning sequence).

The estimate of the channel can be updated at a frequency consistent with the rates of variation (Doppler spreading) of the various parameters $a_k$, $\phi_k$ and $\tau_k$.

Finally, if the channel varies slowly in relation to the duration of a symbol ($T_s$), it is possible to effect this estimate by using several consecutive symbols, thereby making it possible to obtain more reliable estimates.

The exemplary implementation is described hereinbelow in an application of cellular networks operating on the principle of CDMA (Code Division Multiple Access), such as were mentioned previously.

FIG. 2 describes a waveform of the UMTS type used for the uplink, that is to say from a mobile station to a base station.

The structure of the frame of the wave is composed for example of several time slots Si, i being the index of the slot.

Each slot comprises the useful data corresponding to the DPDCH slot (the abbreviation standing for Dedicated Physical Data CHannel) to the number Ndata for example and the control data or DPCCH slot (the abbreviation standing for Dedicated Physical Control CHannel) which are sent in parallel via complex multiplexing on in-phase and quadrature pathways. The useful data are sent on the "in-phase" pathway (I pathway) (FIG. 3) and the control data are sent on the "quadrature" pathway (Q pathway) in this same FIG. 3.

The useful data and control data are modulated for example by BPSK (Binary Phase Shift Keying) and the signal obtained after multiplexing is therefore modulated by QPSK (Quadrature Phase Shift Keying).

Each frame, of duration 10 ms, consists for example of 16 time slots of duration 0.625 ms.

The control sequence shown diagrammatically in FIG. 2 is composed of Npilot bits known to the receiver and used in the channel estimation method according to the invention, of control bits serving for control of power Ntpc bits, and of bits indicating the bit rate used on the useful-data channel Nri bits.

The total number of control bits is for example fixed at 10. The numerical allocation and the arrangement of these three types of control will be fixed for example by the UMTS standard set out in reference [5] ETSI, "Universal Mobile Telecommunications System (UMTS); UMTS Terrestrial Radio Access (UTRA); Concept evaluation", UMTS 30.06 version 3.0.0, TR 101 146 V3.0.0 (1997-12).

The control and useful data bits are for example spread by orthogonal Walsh codes [5], in such a way that the chip or pulse rate homes in on 4.096 MHz.

The spreading factor (or spreading gain) used for the useful bits is chosen for example as a function of their bit rate, the lower the useful bit rate at input, the lower this spreading factor.

Letting k denote the number of bits for the useful data channel (DPDCH) and control channel (DPCCH), it is related to the spreading factor SF by the relation $SF=256/2^k$. The spreading factor may therefore take values lying between 256 and 4. The spreading factors relating to the data pathway and to the control pathway may be different insofar as the number of bits or of symbols conveyed per slot may be different.

FIG. 3 represents a diagram of the spreading, modulation and scrambling of a signal. After spreading by their respective codes, the signal is scrambled by a primary scrambling code linked with the mobile station ($C'_{scramb}$). The resulting signal can, optionally, be scrambled a second time by a secondary scrambling code ($C''_{scramb}$).

The primary scrambling code is a complex code generated from KASAMI (ref) sequences of length 256. The secondary scrambling code has a length of 40960 chips (duration of 10 ms) and constitutes a segment of a Gold (ref) code of length $2^{41}-1$.

The signal transmitted from each mobile station is shaped in the block 10, it is then sent to a transmission filter 11, and it is then received at the level of the base station. This base station or reception station comprises a reception filter 13 followed by a reception block 14 comprising for example a receiver 15 of RAKE type and means such as a microprocessor 16 programmed to implement the steps of the method according to the invention, so as to estimate the parameters of the propagation channel and demodulate the digital signals.

Description of the Steps Implemented in the Course of the Method

The principle of the invention is to demodulate the useful bits or symbols by using a demodulation algorithm made up of two parts, the first consists in estimating the channel and the second in demodulating the useful symbols or bits. The characteristics of the propagation channels such as the temporal spreading or the Doppler spreading may be arbitrary.

The second part is performed according to the RAKE algorithm known to the person skilled in the art, it being possible to find details in the aforesaid reference by Proakis.

According to the invention, the estimation of the channel is carried out by implementing an algorithm comprising at least the three steps described hereinbelow.

These steps are performed for example by processing of the digital signal received after filtering matched to reception by the Nyquist root-type pulse-shaping function for example and correction of any Doppler shift.

First Step:

Every time slot, every $\Delta t_1$ seconds, for example every 0.62 ms, the method:
  estimates the complex amplitude of all the paths selected, by correlation with the reference sequence. The paths selected correspond to the paths retained during the third step or for the initialization of paths selected by comparing the energy of a path with a threshold value,
  demodulates the useful bits by in-phase recombination of these paths.

Second Step:

Every K slots, every $\Delta t_2$ seconds, the method performs the updating of the energy of the paths whose delays belong to the search window with a given analysis interval. This step allied with the third step allows long-term monitoring of the paths present in the window.

Third Step:

Every K*L slots, every $\Delta t_3$ seconds, the method updates the selection of the predominant paths taken into account for the RAKE demodulation.

The periods of implementation $\Delta t_1$, $\Delta t_2$, $\Delta t_3$ of these steps expressed in seconds are chosen for example to satisfy the relation $\Delta t_1 > \Delta t_2 > \Delta t_3$.

In the subsequent description,
  Certain steps of the algorithm, which are known to the person skilled in the art, are not detailed (Nyquist filtering on reception, management of the data stream, etc);
  It is assumed that the correction of any Doppler shift is performed;
  Vectors and matrices are denoted in bold;
  X* is the conjugate complex of the scalar or of the vector X; $x^{\perp} * y$ is the scalar product (euclidean or hermitian) of the vectors x and y; the vector x described between index_start and index_end with an interval resol is denoted:
    x(index_start: index_end: resol)

On entry to the algorithm, the file of samples is composed of complex samples obtained after semi-Nyquist filtering (transmission) and oversampling of the UMTS signal.

On exit from the algorithm, the file obtained is composed of a file of demodulated and despread data bits (complex values). These bits are ready to be decided for example according to the principle stated hereinabove.

The list of the key parameters of the invention and of the variables used in the algorithmic description is given in the form of two tables 1 and 2 appended.

The method is executed according to steps 21 to 27 of the flowchart represented in FIG. 5. These steps are applied for each time slot, that is to say every $\Delta t_1$ seconds.

The method begins with a step 20 for initializing various values in particular:
  the size of the search window expressed in seconds and in samples: Size_win_srch, Sprd_time_max; the subsampling factor for the delays Sub_sam_delay; the forget factor λ used in the course of the second step, the threshold value Threshold_power for the selecting of the paths during the third step; the frequency of updating of the powers K and the updating factor for the delays L.

It also comprises the initialization of a table comprising the predominant paths determined for example by comparing the energy of a path with the threshold value and by retaining only the paths whose energy is greater than this threshold value.

The samples are filtered by means of a semi-Nyquist type filtering for example.

The method begins in step 21 with a calculation of the complex amplitude of the paths retained during the third step. The complex amplitudes are obtained for example by correlation between the pilot symbols received (which are spread) and the code relating to the control bits (product of the spreading code and of the primary scrambling code), the discarding of the contribution of the pilot bits and the averaging (by simple summation of the estimated amplitudes obtained with each of the symbols) over the N_pilot symbols, thereby making it possible in particular to increase the signal/noise ratio.

The correlations performed take into account, at the level of the signal of the pilot symbols received, the delay times identified in the course of step 3.

Figure 6:
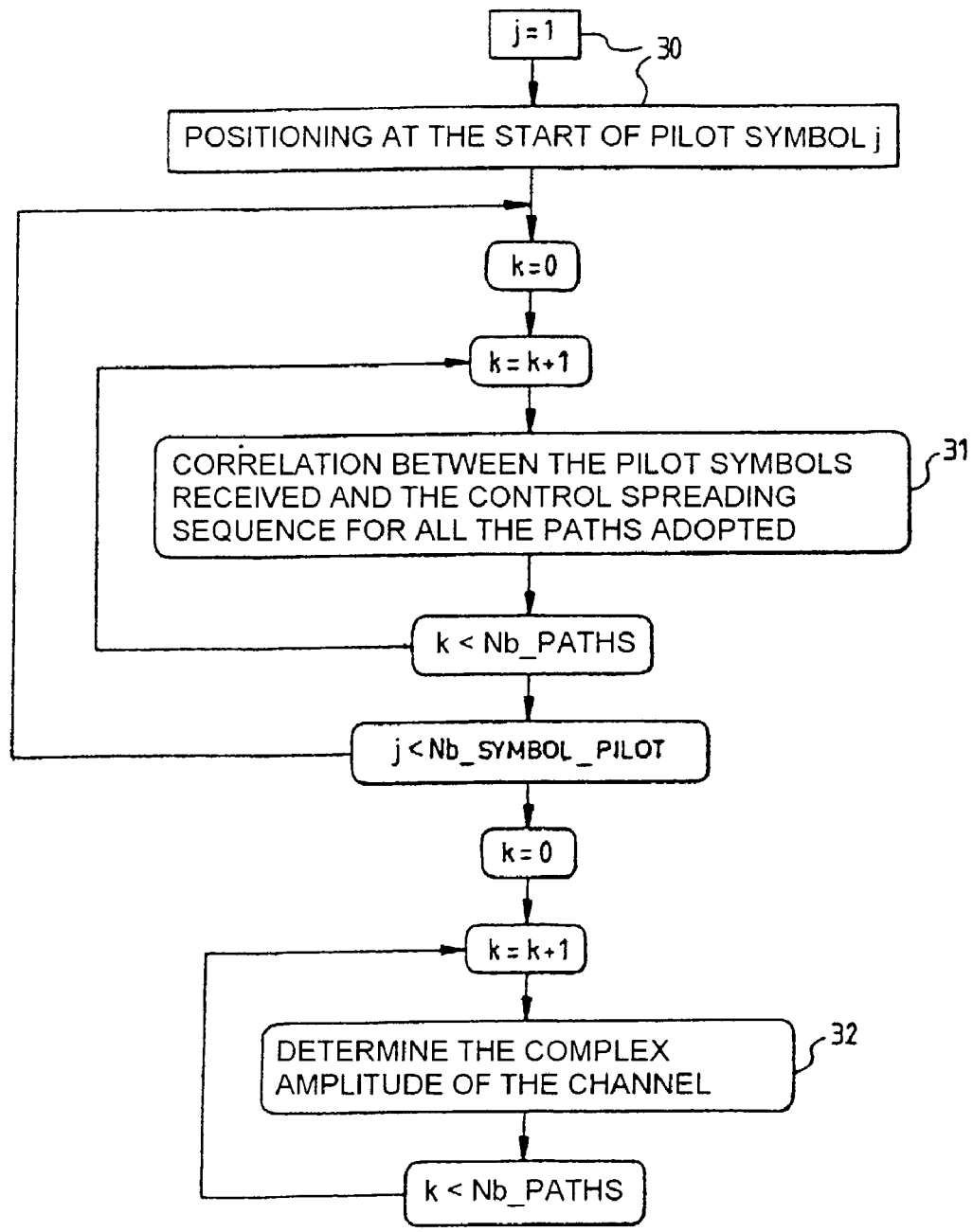

The Estimation of the Complex Amplitude of the Paths Retained for Demodulation for Each Pilot Symbol is Carried out by Stringing Together the Following Steps Described in Conjunction with FIG. 6

Step 30

For j=1 to Nb_symbol_pilot

Positioning at the Start of Pilot Symbol Number j
Ind_start_demod=Ind_center_win+(j−1)*GE_control
   *Nb_sam_chip Step 31—Calculation of the Correlation for All the Paths Retained
For k=1 to Nb_paths
Correlation_pilot(k,j)=Code_sprd_control$^{\perp}$*Signal(Ind_start_demod+Delays(k)*Sub_sam_delay: Ind_start_demod+Delays(k)*Sub_sam_delay+(GE_control−1)*Nb_sam_chip: Nb_sam_chip)*Seq_symbol_pilot(j)*
End "For k=1 to Nb_paths"
End "For j=1 to Nb_symbol_pilot"

Step 32 Calculation of the Complex Amplitude of the Channel
For k=1 to Nb_paths $$\text{Channel\_estimated}(k) = \frac{1}{\text{Nb\_symbols\_pilot}} \sum_{j=1}^{\text{Nb\_symbol\_pilot}} \text{Correlation\_pilot}(k, j)$$

For "k=1 to Nb-paths"

Figure 7:
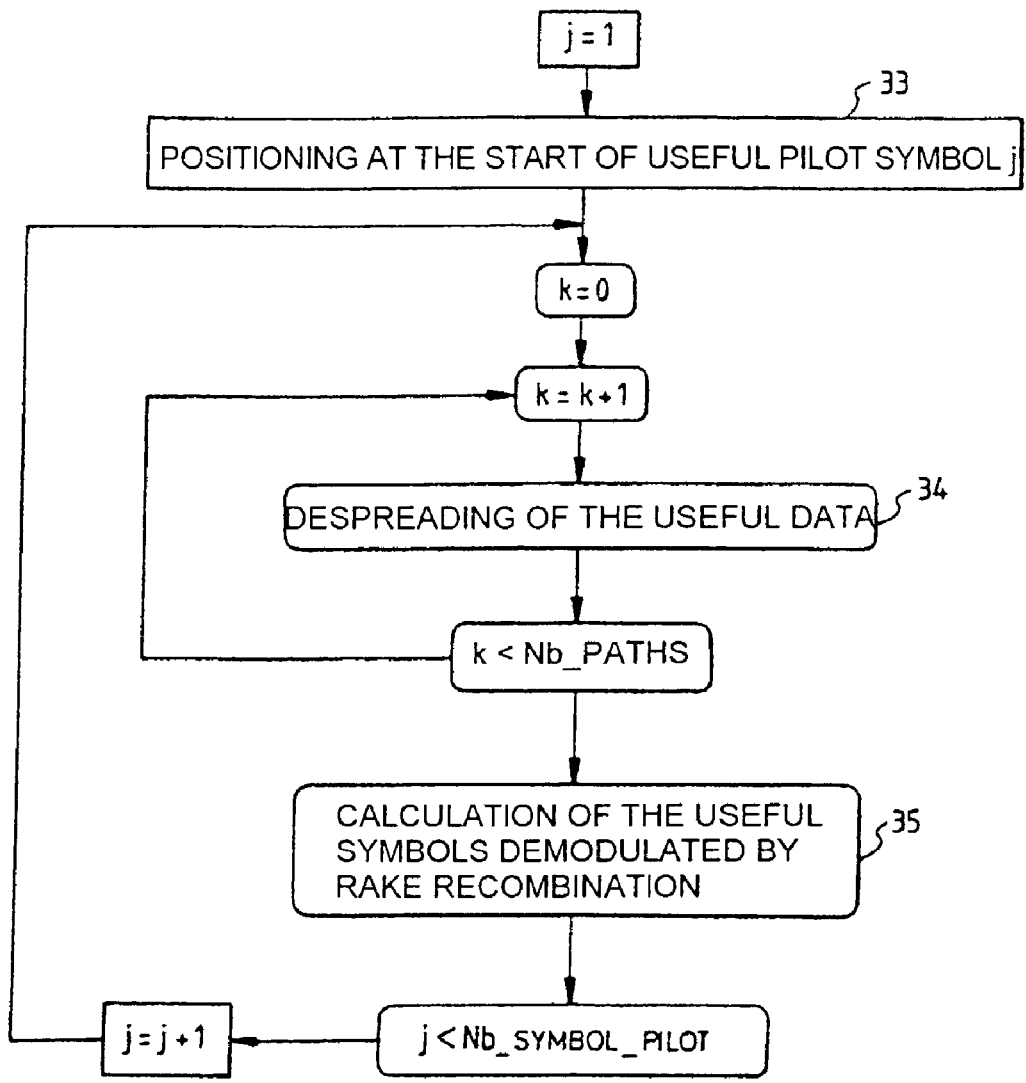
Figure 8:
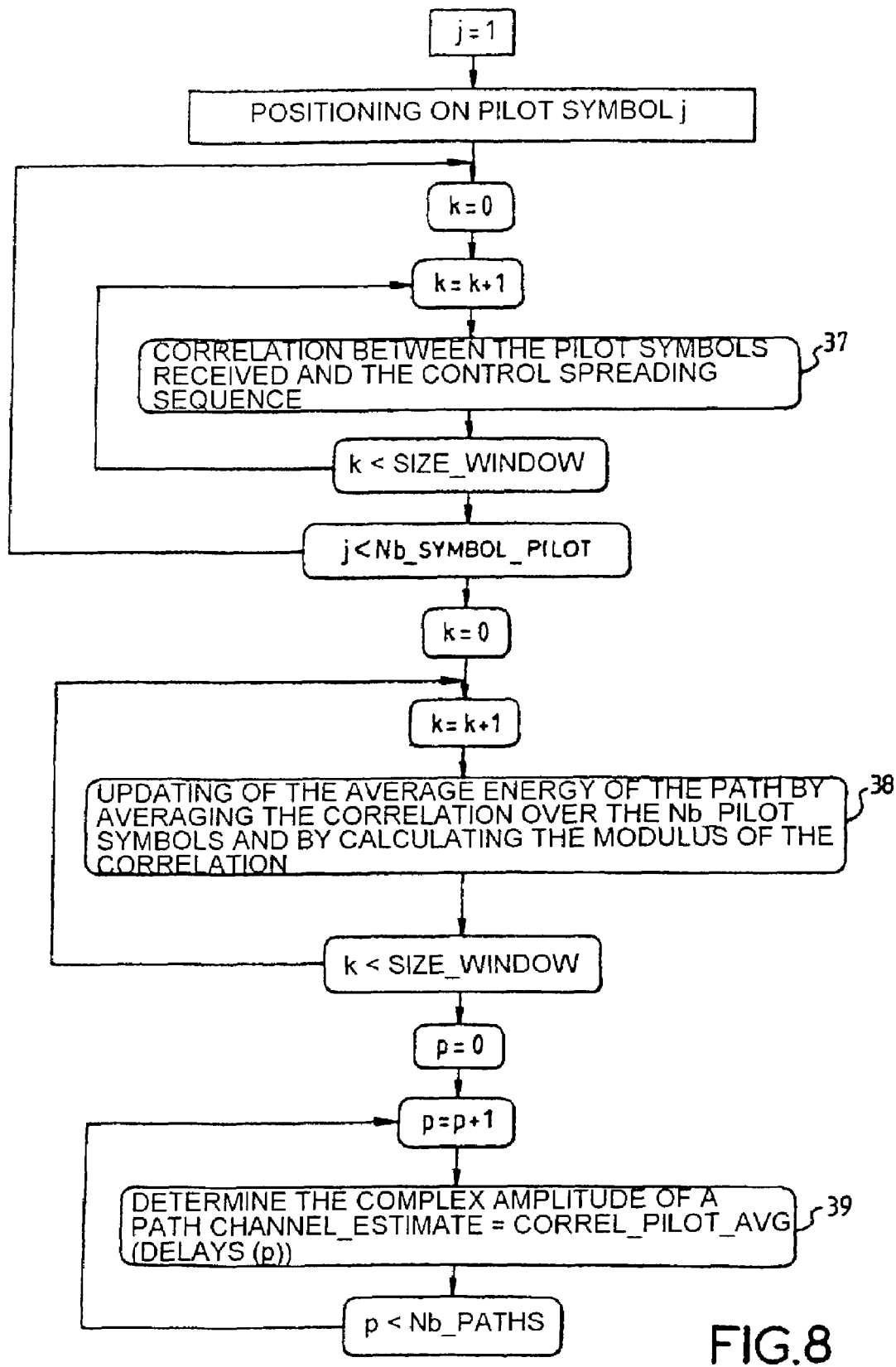

Step 22 (FIG. 5) which follows is a step of demodulating the useful symbols comprising a step of despreading and of demodulation according to the RAKE principle, and the execution of the steps described hereinbelow and in FIG. 7:
  For j=1 to Nb_symbol_data Step 33—Positioning at the Start of Useful Symbol Numbers j
Ind_start_demod=Ind_center_window+(j−1)
*GE_data*Nb_sam_chip Step 34—Despreading
For k=1 to Nb_paths
Correlation_data(k,j)=Code_sprd_data$^\perp$*Signal(Ind_start_demod+Delays(k)*Sub_sam_delay: Ind_start_demod+Delays(k)*Sub_sam_delay+(GE_control−1)*Nb_sam_chip: Nb_sam_chip)
End "For k=1 to Nb_paths"

Step 35—Calculation of the Useful Symbols Demodulated by RAKE Recombination
Symbol_data_demod(j)=Channel_estimated(1: Nb_paths)$^\perp$*Correlation_data(1: Nb_paths, j)
End "For j=1 to Nb_symbol_data"

The second step of the method carried out every K slots, every $\Delta t_2$ seconds and corresponding to step 23 (FIG. 5) consists in updating the energy of each path situated in the search window and determining the complex amplitude of the path. These two steps are detailed in FIG. 8.

The method performs (step 37) the correlation between each pilot symbol received and the control code, for all possible delays lying within the search window and with a given resolution. The resolution varies for example between the duration of the sample and the duration of the chip.

The search window is for example centered on the current center of the impulse response of the channel, the center being determined for example in step 3, and its size being equal to twice the maximum temporal spreading taken into account by the algorithm.

Subsequently (step 38), the method averages the complex amplitudes estimated at the level of the pilot symbol, over the entire set of pilot symbols, so as to increase the quality of estimation, doing so for all possible paths.

Finally, the method (step 39) calculates the instantaneous power C(k) of these paths (square of the modulus of the complex amplitudes) which is used to obtain the average power $C_{long-term}(k)$, with the aid of the following formula (first-order low-pass filtering):

$$C_{long-term}(k)=\lambda C_{long-term}(k)+C(k)$$

where $\lambda$ is a forget factor whose value, just like that of the parameter K, must be chosen as a function of the characteristics of the propagation channel.

This smoothing makes it possible to circumvent the fast fading, which locally may cause a drop in the instantaneous power of a strong path.

Updating of the Energy of Each Path Contained in the Search Window

This Update Begins with the Determination of a Table, Step 37 Containing, for All the Possible Delay Times Situated in the Search Window and for Each Pilot Symbol, the Correlations Between the Pilot Symbols Received and the Control Spreading Sequence
For j=1 to Nb_symbol_pilot Positioning on Pilot Symbol Number j
Ind_start_demod=Ind_center window+(j−1)
*GE_control*Nb_sam_chip Correlation Between the Pilot Symbols Received and the Control Sequence
For k=1 to Size_win_srch
Correlation_pilot(k,j)=Code_sprd_control$^\perp$*Signal(Ind_start_demod+k*Sub_sam_delay: Ind_start_demod+k*Sub_sam_delay+(GE_control−1)*Nb_sam_chip: Nb_sam_chip)*Seq_symbol_pilot(j)
End "For k=1 to Size_win_srch"
End "For j=1 to Nb_symbol_pilot"

The following step 38 consists, for each path in the search window, in averaging the correlations over the Nb_symbols_pilot, in calculating the modulus of the correlation and in updating the average energy of the path.
For k=1 to Size_win_srch $$\text{Correl\_pilot\_avg}(k) = \frac{1}{\text{Nb\_symbols\_pilot}} \sum_{j=1}^{\text{Nb\_symbol\_pilot}} \text{Correlation\_pilot}(k, j)$$

Powr_inst_path(k)=modulus(Correl_pilot_avg(k))
Powr_avg_path(k)=$\lambda$*Powr_avg_path(k)+Powr_inst_path(k)$^2$
End "For k=1 to Size_win_srch"

The Next Step 39 Corresponds to the Calculation of the Complex Amplitude of the Channel
For p=1 to Nb_paths
Channel_estimated(p)=Correl_pilot_avg(Delays(p))
End "For p=1 to Nb paths"

Step 3 or the third step of the method is carried out every K*L slots, every $\Delta t_3$ seconds for example by executing detailed in FIG. 9 making up step 24 for updating the predominant paths which are used during the first step of the method for demodulating the signals received.

The execution of these steps begins for example in the following manner: a step 50 of calculating the maximum average power, followed by a step 51 of selecting all the paths for which the ratio of their average power to the average power exceeds a threshold, for example 0.5.

According to a variant implementation of the method, after selection of the paths (step 51), the method continues with a step 52 of choosing the best sampling comb, the paths retained ultimately are separated by an integer number of chips.

On the basis of the paths selected, the method determines for example subsequently with the aid of steps and procedures which are well known to the person skilled in the art the number of paths selected on the best comb and the vector of Delays of the indices of the paths retained, step 53.

Step 54 consists in calculating the complex amplitude of the paths selected.

The next step 55 comprises an updating of the center of the search window and the tables containing the values of the delays and of the average powers for the paths selected.

Updating of the Choice of Paths Retained for Demodulation

Step 50—Calculation of the Maximum Average Power (Among All the Possible Paths)
Powr_avg_max=MAX(Powr_avg_path)

Step 51—Selection of the Paths Whose Average Power Exceeds the Threshold
For k=1 to Size_win_srch
IF (Powr_avg path (k)>Powr_avg_max*Threshold_power)
Then Selec_Paths(k)=Powr_avg_path(k)
Otherwise Selec_paths(k)=0
END IF
End "For k=1 to Size_win_srch"

Step 52—Determination of the Best Sampling Comb

Initially Calculation of the Average Power Aggregated over All the Paths Exceeding the Threshold and Situated on the Same Sampling Comb (the Paths of a Given Comb are Separated by an Integer Number of Chips)
Nb_delay_chip=Nb_sam_chip/Sub_sam_delay
For k=1 to Nb_delay_chip−1

$$\text{Powr\_tot\_comb}(k) = \sum_{p=0}^{\text{Size\_win\_srch}} \text{Selec\_paths}(k + p * \text{Nb\_delay\_chip})$$

paths(k+p*Nb_delay_chip)
End "For k=1 to Nb_delay_chip−1"
Then subsequently choosing the best sampling comb by determining the maximum aggregate total power:
Ind_best_comb =ARG(MAX(Powr_tot_comb))

Step 53—On the Basis of the Paths Selected, the Method Calculates with the Aid of Steps Known to the Person Skilled in the Art
  the number Nb_paths of paths selected on the best comb, which it can compare with a specified number for example Nb_paths_max, and
  the vector Delays (1: Nb_paths) of the indices of the paths retained on the best comb.
The method then calculates during step 54 and for the paths selected in step 52
The Complex Amplitude or the Estimate of the Current Channel
For p=1 to Nb_paths
Channel_estimated(p)=Correl_pilot_avg(Delays(p))
End "For p=1 to Nb_paths"
Step 55 Comprises the Updating of the center of the Impulse Response of the Current Channel in Such a Way as to Update the Position of the Center of the Search Window by a Calculation of the Average Delay:
Delay_average=0.5* (Delays(1)+Delays(Nb_paths))

And the Updating of the Delays and Powr_avg_path Tables as Well as the Updating of the Index of the Center of the Search Window Ind_center_window
Delays(1: Nb_paths) Delays(1: Nb_paths)−Delay_average
Ind_center_window=Ind_center_window+
  Delay_average*Sub_sam_delay
  In the case where the number Num_slot is not a multiple of K*L, the method processes the time slot with the aid of procedure known to the person skilled in the art so as to determine the amplitude and the phase of each of the paths in the course of step 26 FIG. 5 before performing steps 21 and 22.

The parameters K, L, Δt$_1$, Δt$_2$, Δt$_3$ as well as the other internal parameters, especially the size of the search window, the search interval for the delays considered in the second step, the maximum number of paths taken into account for the RAKE recombination, and the threshold for selecting the paths, must be chosen as a function of the characteristics of the propagation channel and the performance/numerical complexity compromise to be complied with.

Without departing from the scope of the invention, the learning or reference sequence is transmitted sequentially or in parallel with that of the useful data.

Likewise without departing from the method of the invention, the channel is for example estimated several times per time slot, the step of estimating the complex amplitude being carried out by using a lower number of learning symbols than the total number of learning symbols available on a time slot. This mode of implementation of the method is especially beneficial in respect of very rapidly fluctuating channels.

It is also possible to carry out the interpolation in such a way that at any moment an estimation of a channel is available (linear filtering on the basis of several estimated values of the channel).

The method comprises for example a step of deciding the demodulated bits, these decided bits possibly being used to improve the estimation of the channel.

The learning symbols may be consecutive or be separated in time. For example, other control symbols may be inserted between the learning symbols.

Exemplary control sequence:
-------- _____ ---- ====== -------------
---:    learning symbols
___:    another type of control symbol (type 1)
===:    another type of control symbol (type 2)

The estimation of the channel is achieved for example by simple correlation of the pilot symbols received with the spread learning sequence, thereby implicitly assuming that the spread learning sequence is white, its autocorrelation function being a Dirac.

It is also possible to take account of the non ideal character of the learning sequence by correlating the pilot symbols received with a whitened version of the learning sequence.

According to another variant implementation of the method, the paths retained during the third step are not separated by an integer number of chip durations.

APPENDIX

List of the Key Parameters of the Invention and of the Variables Used in the Algorithmic Description

TABLE 1

Key parameters of the algorithm

| NAME | Data type | Description | Typical value |
|---|---|---|---|
| Nb_symbol pilot | INTEGER | Number of pilot symbols | 8 |
| Nb_symbol data | INTEGER | Number of useful symbols | Function of the bit rate |
| GE_control | INTEGER | Control pathway spreading gain | 256 |
| GE_data | INTEGER | Data pathway spreading gain | Function of the bit rate |
| Nb_sam_chip | INTEGER | Number of samples per chip | 2 or 4 |
| Sprd_time_max | REAL | Size of the search window (seconds) | 20 10$^{-6}$ (1) |
| Sub_sam_delay | INTEGER | Delay subsampling factor | 1/2/4 (2) |
| Size_win_srch | INTEGER | Size of the window (samples) | 656 (3) |
| λ | REAL | Forget factor (updating of the powers of the paths) | 0.95 |
| Threshold_power | REAL | Threshold for selecting the paths | 0.5 (4) |

TABLE 1-continued

Key parameters of the algorithm

| NAME | Data type | Description | Typical value |
|------|-----------|-------------|---------------|
| K | INTEGER | Frequency of updating of the powers | 5 (function of the channel) (6) |
| L | INTEGER | Frequency of updating of the delays | 5 (function of the channel) (6) |

(1): Maximum value of the temporal spreading of the mobile radio channel in urban surroundings.
(2): The temporal resolution during the search for the paths is equal to $T_c$/(Nb_sam_chip/Sub_sam_delay) where $T_c$ is the chip duration. The possible values of the temporal resolution for the path search are $T_c/2$, $T_c/4$ and $T_c$.
(3): This value represents the number of delay times considered in the search window. It is equal to:
Size__win_srch=2*(1/$T_c$)*Sprd_time_max*(Nb_sam_chip/Sub_sam_delay)
(656=2*4.096 $10^6$*20 $10^{-6}$* 4/1)
(4): This value signifies that any propagation path whose average power is greater than half the maximum average power is selected.
(5): This value is expressed in terms of number of time slots (see paragraph 2.2.1).
(6): This value is expressed in a unit equal to K times the duration of the time slot (thus, the delay times are updated every K*L slots).

TABLE 2

Variables used in the algorithmic description

| NAME | Data type | Dimension | Description |
|------|-----------|-----------|-------------|
| Num slot | INTEGER | 1 | Slot number |
| Correlation pilot | COMPLEX | Size_win_srch* Nb symbol pilot | Control code/pilot symbols correlation |
| Ind_center window | INTEGER | 1 | Index of the center of the search window |
| Ind_start_demod | INTEGER | 1 | Index of start of demodulation |
| Code_sprd_control | INTEGER | GE_control | Control spreading code |
| Code_sprd_data | INTEGER | GE_data | Data spreading code |
| Seq_symbol_pilot | INTEGER | Nb_symbol_pilot | Sequence of pilot symbols |
| Signal | COMPLEX | — | Complex signal received |
| Correl_pilot_avg | COMPLEX | Size_win_srch | Average of the pilot correlations |
| Nb_paths | INTEGER | 1 | Number of paths selected |
| Delays | INTEGER | Variable | Delays of the paths selected |
| Channel_estimated | COMPLEX | Variable | Current estimated channel |
| Powr_inst_path | REAL | Size_win_srch | Instantaneous power of the paths |
| Powr_avg_path | REAL | Size_win_srch | Average power of the paths |
| Powr_avg_max | REAL | 1 | Maximum average power |
| Selec_paths | REAL | Size_win_srch | Path selection indicator |
| Nb_delay_chip | INTEGER | 1 | Number of paths investigated per chip |
| Powr_tot_comb | REAL | Nb_delay_chip | Total power per comb |

TABLE 2-continued

Variables used in the algorithmic description

| NAME | Data type | Dimension | Description |
|------|-----------|-----------|-------------|
| Ind_best_comb | INTEGER | 1 | Index of the best comb |
| Delay-average | INTEGER | 1 | Current average delay |
| Correlation_data | COMPLEX | Nb_paths* Nb_bits_data | Data code/data bits correlation |
| symbols_data_demod | REAL | Nb_symbol_data | demodulated useful symbols |

The invention claimed is:

1. A method of estimating demodulating parameters of a propagation channel between a source transmitting data and a receiver, the method using at least one learning sequence that comprises symbols and that is known to the receiver to decode a data signal, the data signal being sent in successive frames, each frame being partitioned into a specified number of time slots, the method comprising:
   initializing K and L variables, where K represents a frequency of updating of power and L represents an updating factor for delays;
   choosing a search window;
   estimating a complex amplitude and energy of each predominant path situated in the search window over a duration of each of the number of time slots;
   demodulating data bits of each predominant path;
   updating a complex amplitude and energy of each possible path of the search window every K slots; and
   selecting, every K×L slots, the predominant paths that are used in the estimating and demodulating steps.

2. The method as claimed in claim 1, wherein the data signal is a signal spread according to a given spreading code, and further comprising:
   determining, every K slots, an average power or the energy for each possible path of the search window by correlating between symbols received and a control spreading sequence, an average of correlations over a set of symbols of a learning sequence,
   calculating, every K slots, a modulus of the correlating and updating an average energy of each possible path by a calculation of instantaneous average power equal to a sum of instantaneous power of the possible paths and of a term corresponding to a product of a forget factor and of an average power, and
   determining, every K slots, the complex amplitude of the propagation channel by correlating between the symbols received and the control spreading sequence; and
   selecting predominant paths, every K×L slots, by comparing an average energy of a path with a fixed threshold value, such as the maximum power of all the paths, and determining a complex amplitude of the propagation channel.

3. The method as claimed in claim 1, further comprising, determining a best sampling comb by argument of a maximum aggregate total power over each possible path exceeding a threshold value for each possible path separated by an integer number of chips and by determining an aggregate maximum power.

4. The method as claimed in claim 1, further comprising, at least one of comparing a number of paths selected with a maximum value and updating the average power of the paths, an index of a center of the search window, and a vector of delays of indices of the paths.

5. The method as claimed in claim 1, further comprising determining decided bits of each predominant path, wherein the determining is performed after demodulation of the data bits of each predominant path.

6. The method as claimed in claim 1, wherein the learning sequence is transmitted sequentially or in parallel with that of the data signal.

7. A device for estimating parameters of a channel for propagating digital signals between a means of transmission and a means of reception to demodulate a data signal, the data signal being sent in successive frames, each frame being partitioned into a specified number of time slots, the device comprising a calculator or device configured to implement the method according to claim 1.

8. The device as claimed in claim 7, wherein said means of transmission comprises a means for allowing spreading of the digital signal and the means of reception comprises a RAKE-type receiver.

9. The application of the method according to claim 1, for demodulating a spread band digital signal.

10. The application of the method according to claim 1, for demodulating a CDMA or UMTS signal.

* * * * *